(12) United States Patent
Nedachi et al.

(10) Patent No.: US 8,140,229 B2
(45) Date of Patent: Mar. 20, 2012

(54) TRANSMISSION CONTROL DEVICE OF MOTORCYCLE

(75) Inventors: Yoshiaki Nedachi, Saitama (JP);
Yoshiaki Tsukada, Saitama (JP);
Takashi Ozeki, Saitama (JP); Hiroyuki Kojima, Saitama (JP); Kazuyuki Fukaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 836 days.

(21) Appl. No.: 12/200,546

(22) Filed: Aug. 28, 2008

(65) Prior Publication Data
US 2009/0062069 A1 Mar. 5, 2009

(30) Foreign Application Priority Data
Aug. 31, 2007 (JP) .................................. 2007-226545

(51) Int. Cl.
*G06F 7/00* (2006.01)
(52) U.S. Cl. ........................................................ 701/51
(58) Field of Classification Search .................... 701/51, 701/53–55, 71; 477/92, 94
See application file for complete search history.

(56) References Cited

U.S. PATENT DOCUMENTS
2006/0272875 A1* 12/2006 Matsuda ....................... 180/197
2007/0243972 A1* 10/2007 Minami ......................... 477/78
2009/0062994 A1* 3/2009 Nedachi et al. ................. 701/51

FOREIGN PATENT DOCUMENTS
JP 3-2926 U 1/1991
JP 11-201195 A 7/1999
JP 2007-218269 A 8/2007

\* cited by examiner

*Primary Examiner* — Kim T Nguyen
(74) *Attorney, Agent, or Firm* — Birch, Stewart, Kolasch & Birch, LLP

(57) ABSTRACT

A transmission control device of a motorcycle can detect a predetermined traveling state based on the difference in rotational speed between a front wheel and a rear wheel, and can execute a shift-change control suitable for the traveling state. A transmission control device of a motorcycle includes a shift-change control instruction part that performs an automatic shift change of an AMT (automatic manual transmission) in response to at least vehicle-speed information. A first sensor detects a rotational speed of a front wheel, which constitutes a driven wheel. A second sensor detects a rotational speed of a rear wheel, which constitutes a drive wheel. A rotational-speed-difference detector detects the difference in rotational speed between the front wheel and the rear wheel. The control part inhibits the automatic shift change when the rotational speed of the rear wheel becomes larger than the rotational speed of the front wheel by a predetermined value or more.

18 Claims, 4 Drawing Sheets

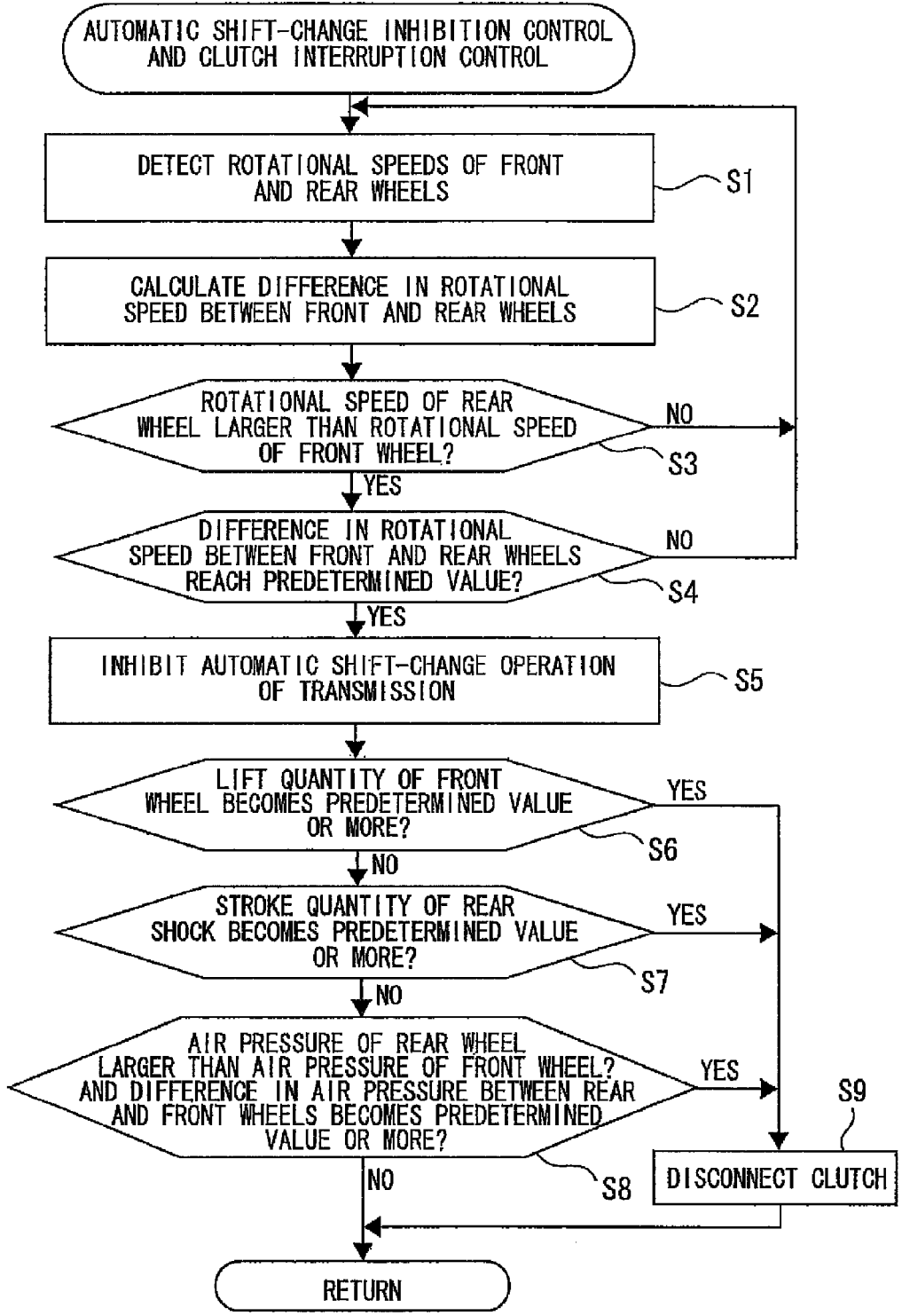

TRANSMISSION CONTROL DEVICE OF MOTORCYCLE

CROSS-REFERENCE TO RELATED APPLICATIONS

This nonprovisional application claims priority under 35 U.S.C. §119(a) on Patent Application No. 2007-226545, filed in Japan on Aug. 31, 2008, the entirety of which is incorporated herein by reference.

BACKGROUND OF THE INVENTION

1. Field of the Invention

The present invention relates to a transmission control device of a motorcycle. More particularly, the present invention relates to a transmission control device of a motorcycle, which detects a predetermined traveling state based on the difference in rotational speed between a front wheel and a rear wheel, and executes a shift-change control suitable for the traveling state.

2. Background of the Invention

Conventionally, there has been known a technique in which a detector for detecting a rotational speed is respectively mounted on front and rear wheels of a vehicle. A specific control is executed when a difference arises between the rotational speed of the front wheel and the rotational speed of the rear wheel.

JP-UM-A-3-2926 discloses a four-wheel drive-type four-wheeled vehicle which arranges an electromagnetic clutch between an engine and a continuously variable transmission. A control device detects when the vehicle travels on a slippery road due to the accumulation of snow or the like when a period in which the difference in rotational speed between the front wheel and the rear wheel exceeds a predetermined value is continued for a predetermined time. When such determination is performed, the control device changes over the electromagnetic clutch to a direct engagement state, even when the vehicle travels at a predetermined speed or less thus preventing a partial clutch engagement state of the electromagnetic clutch from being continued for a long time.

However, in JP-UM-A-3-2926, a technique that detects a traveling state particular to a motorcycle by detecting a difference in rotational speed between the front wheel and the rear wheel of the motorcycle and changes over a shift-change control of an automatic transmission to a different state from a normal state has not been studied.

SUMMARY OF THE INVENTION

It is an object of the present invention to provide a transmission control device of a motorcycle that can overcome the above-mentioned drawbacks of the background art, can detect a predetermined traveling state based on the difference in rotational speed between the front wheel and the rear wheel, and can execute a shift-change control suitable for the traveling state.

To achieve the above-mentioned object, according to a first aspect of the present invention, a transmission control device of a motorcycle includes a control part for performing an automatic shift change of a transmission in response to at least vehicle-speed information. A first sensor detects a rotational speed of a front wheel, which constitutes a driven wheel. A second sensor detects a rotational speed of a rear wheel, which constitutes a drive wheel. A rotational-speed-difference detector is configured to detect a difference in rotational speed between the front wheel and the rear wheel based on information from the first sensor and the second sensor. The control part inhibits the automatic shift change when the rotational speed of the rear wheel becomes larger than the rotational speed of the front wheel and the difference in rotational speed between the front wheel and the rear wheel becomes a predetermined value or more.

According to a second aspect of the present invention, the transmission control device is configured to interrupt the transmission of a driving force to the rear wheel by disconnecting a clutch when a separation quantity between the front wheel and a road surface becomes a predetermined value or more during the inhibition of the automatic shift change.

According to a third aspect of the present invention, the separation quantity between the front wheel and the road surface is obtained by calculating a distance between the front wheel and the road surface using a photo sensor.

According to a fourth aspect of the present invention, the transmission control device includes a sensor for detecting a stroke quantity of a rear shock unit provided for suspending the rear wheel from a vehicle body, and the control part determines whether or not the separation quantity between the front wheel and the road surface reaches a predetermined value based on whether or not the stroke quantity reaches a predetermined value.

According to a fifth aspect of the present invention, the transmission control device further includes an air pressure detector that detects air pressure of the front wheel and air pressure of the rear wheel, and the control part determines whether or not the separation quantity between the front wheel and the road surface reaches a predetermined value based on whether or not the air pressure of the rear wheel is larger than the air pressure of the front wheel and the difference in air pressure between the front wheel and the rear wheel reaches a predetermined value.

According to the first aspect of the present invention, the transmission control device of the motorcycle includes the control part for performing the automatic shift change of the transmission in response to at least vehicle-speed information, the first sensor that detects the rotational speed of the front wheel, which constitutes the driven wheel, the second sensor that detects the rotational speed of the rear wheel, which constitutes the drive wheel, and the rotational-speed-difference detector that is configured to detect a difference in rotational speed between the front wheel and the rear wheel based on information from the first sensor and the second sensor, and the control part inhibits the automatic shift change when the rotational speed of the rear wheel becomes larger than the rotational speed of the front wheel and the difference in rotational speed between the front wheel and the rear wheel becomes a predetermined value or more. In this manner, by detecting a predetermined traveling state that occurs at the time of accelerating the motorcycle such as a state that the front wheel is separated from the road surface or a state that the rear wheel slips against the road surface and by inhibiting the automatic shift change during such a traveling state, it is possible to prevent the rotational speed of the rear wheel from being largely changed.

According to the second aspect of the present invention, the transmission control device is configured to interrupt the transmission of the driving force to the rear wheel by disconnecting the clutch when the separation quantity between the front wheel and the road surface becomes a predetermined value or more during the inhibition of the automatic shift change. Accordingly, it is possible to prevent the separation quantity between the front wheel and the road surface from becoming a predetermined value or more when the front wheel is separated from the road surface due to the acceleration.

According to the third aspect of the present invention, the separation quantity between the front wheel and the road surface is obtained by measuring a distance between the front wheel and the road surface using a photo sensor. Accordingly, it is possible to directly measure the separation quantity between the front wheel and the road surface thus acquiring the accurate separation quantity.

According to the fourth aspect of the present invention, the transmission control device includes the sensor that detects the stroke quantity of the rear shock unit provided for suspending the rear wheel from the vehicle body, and the control part determines whether or not the separation quantity between the front wheel and the road surface reaches a predetermined value based on whether or not the stroke quantity reaches a predetermined value. Accordingly, it is possible to detect whether or not the separation quantity between the front wheel and the road surface reaches a predetermined value using a simple device such as a displacement sensor for detecting the reciprocating movement.

According to the fifth aspect of the present invention, the transmission control device further includes an air pressure detecting device that detects air pressure of the front wheel and air pressure of the rear wheel, and the control part determines whether or not the separation quantity between the front wheel and the road surface reaches a predetermined value based on whether or not the air pressure of the rear wheel is larger than the air pressure of the front wheel and the difference in air pressure between the front wheel and the rear wheel reaches a predetermined value. Accordingly, it is possible to detect whether or not the separation quantity between the front wheel and the road surface reaches a predetermined value using a highly useful device which is used also for the maintenance before and after traveling or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a flowchart showing a flow of the automatic shift-change inhibition control and a clutch interruption control according to one embodiment of the present invention.

DETAILED DESCRIPTION OF THE PREFERRED EMBODIMENTS

Figure 1:
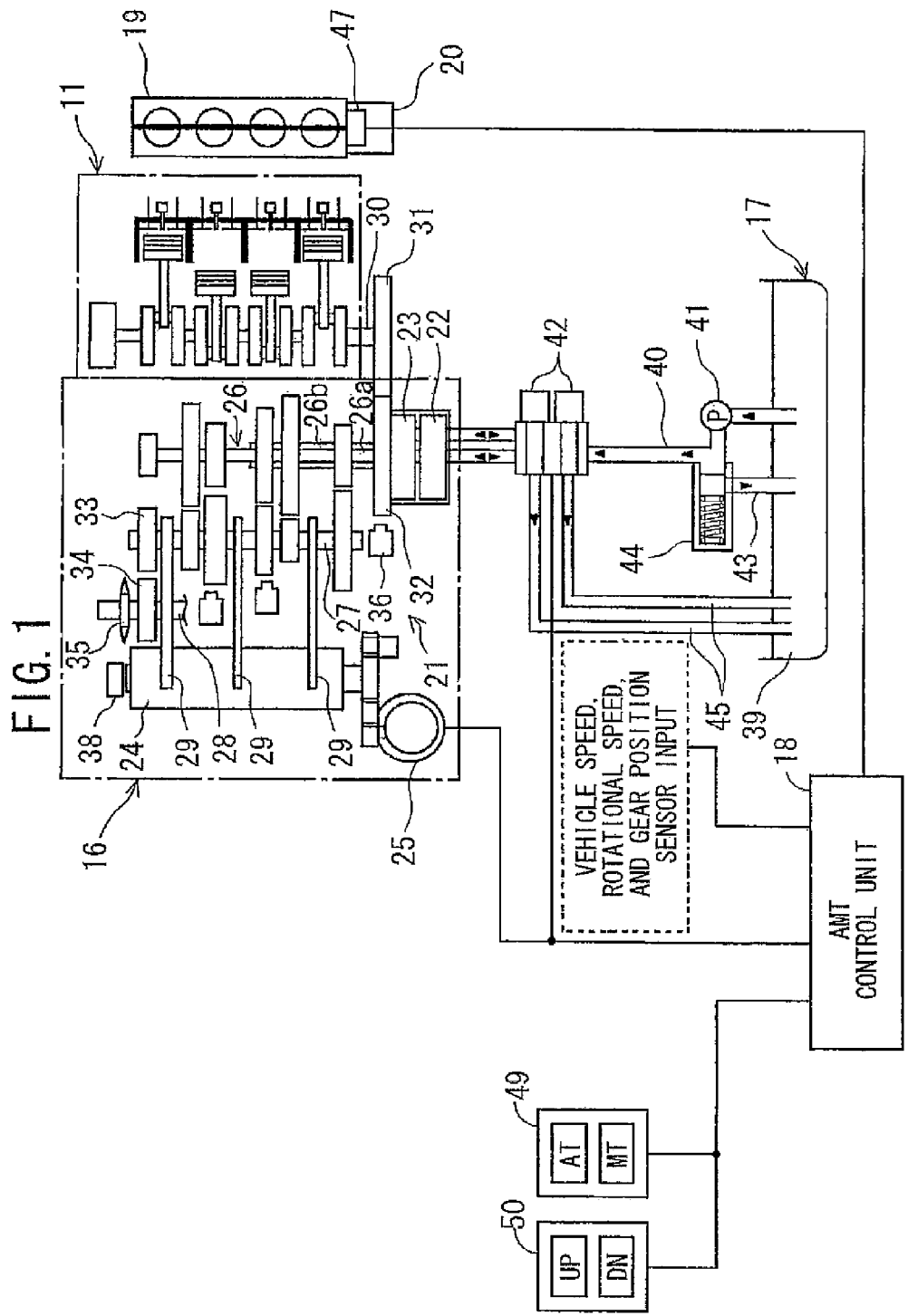
FIG. 1 is a system constitutional view of an automatic manual transmission according to one embodiment of the present invention and devices around the automatic manual transmission.

The present invention will now be described in detail with reference to the accompanying drawings, wherein the same reference numerals will be used to identify the same or similar elements throughout the several views. It should be noted that the drawings should be viewed in the direction of orientation of the reference numerals.

Hereinafter, a preferred embodiment of the present invention is explained in detail in conjunction with drawings. FIG. 1 is a system constitutional view of an automatic manual transmission (hereinafter, referred to as an AMT), which constitutes an automatic transmission applied to a motorcycle and devices around the AMT. The driving of the AMT 16 connected to an engine 11 is controlled by a clutch-use hydraulic device 17 and an AMT control unit 18. The engine 11 includes a throttle-by-wire (TBW) type throttle body 19, and the throttle body 19 includes a motor 20 for opening and closing the throttle.

The AMT 16 includes a multi-stage transmission gear 21, a first clutch 22, a second clutch 23, a shift drum 24, and a shift control motor 25 for rotating the shift drum 24. A large number of gears constituting the transmission gear 21 are respectively joined to or loosely fitted on a main shaft 26, a counter shaft 27 and a speed-change gear output shaft 28. The main shaft 26 includes an inner main shaft 26a and an outer main shaft 26b. The inner main shaft 26a is joined to the first clutch 22. The outer main shaft 26b is joined to the second clutch 23. A clutch (not shown in the drawing), which is displaceable in the axial direction of the main shaft 26 is mounted on the main shaft 26, while a clutch (not shown in the drawing), which is displaceable in the axial direction of the counter shaft 27 is mounted on the counter shaft 27. End portions of shift forks 29 are respectively engaged with cam shafts (not shown in the drawing) formed on the clutches and the shift drum 24.

A primary drive gear 31 is joined to the output shaft of the engine 11, i.e. to a crankshaft 30. The primary drive gear 31 is meshed with a primary driven gear 32. The primary driven gear 32 is joined to the inner main shaft 26a by way of the first clutch 22 and, at the same time, is joined to an outer main shaft 26b by way of the second clutch 23.

A counter shaft output gear 33, which is joined to the counter shaft 27 is meshed with an output driven gear 34 joined to the speed-change gear output shaft 28. A drive sprocket wheel 35 is joined to the speed-change gear output shaft 28. A driving force is transmitted to a rear wheel WR (see FIG. 2), which constitutes a drive wheel by way of a drive chain (not shown in the drawing) wound around the drive sprocket wheel 35. Furthermore, in the inside of the AMT 16, an engine rotational speed sensor 36 arranged to face an outer periphery of the primary driven gear 32 in an opposed manner and a gear position sensor 38 for detecting a present gear stage position based on a rotational position of the shift drum 24 are arranged. Furthermore, a throttle sensor 47, which outputs a throttle opening signal, is mounted on the throttle body 19.

The clutch-use hydraulic device 17 includes an oil tank 39 and a pipe passage 40 for feeding oil stored in the oil tank 39 to the first clutch 22 and the second clutch 23. A pump 41 and a valve 42 are mounted on the pipe passage 40. A regulator 44 is arranged on a return pipe passage 43 connected to the pipe passage 40. The valve 42 is configured to apply oil pressure to the first clutch 22 and the second clutch 23 individually. Furthermore, a return pipe passage 45 for returning oil is also provided to the valve 42.

A mode switch 49 for changing over an operation of the AMT control unit 18 between an automatic shift-change (AT) mode and a manual shift-change (MT) mode, and a shift select switch 50, which instructs the AMT control unit 18 to perform a shift-up (UP) operation or a shift-down (DN) operation are connected to the AMT control unit 18. The AMT control unit 18 includes a microcomputer (CPU), and is configured to automatically or semi-automatically change over a gear stage position of the AMT 16 by controlling the valve 42 and the shift control motor 25 in response to output signals of the respective sensors and switches.

The AMT control unit 18 automatically changes over the transmission gear 21 in response to information such as vehicle speed, engine rotational speed, and throttle opening when the AT mode is selected. On the other hand, when the MT mode is selected, the AMT control unit 18 performs a shift changing operation of the select switch 50 to shift up or shift down the transmission gear 21 in accordance with the shift-change manipulation of the select switch 50. Here, also when the MT mode is selected, the AMT control unit 18 may be configured to execute an auxiliary automatic shift control for preventing the excessive rotation or the stall of the engine.

In the clutch-use hydraulic device 17, oil pressure is applied to the valve 42 by the pump 41. The oil pressure is controlled by the regulator 44 for preventing the oil pressure from exceeding an upper limit value. When the valve 42 is opened based on an instruction from the AMT control unit 18, the oil pressure is applied to the first clutch 22 or the second clutch 23 so that the primary driven gear 32 is joined to the inner main shaft 26a or the outer main shaft 26b by way of the first clutch 22 or the second clutch 23. Furthermore, when the valve 42 is closed and the application of the oil pressure is stopped, the first clutch 22 and the second clutch 23 are biased in the direction which disconnects the engagement between the primary driven gear 32 and the inner main gear 26a or the outer main gear 26b due to a return spring (not shown in the drawing) incorporated in the first clutch 22 and the second clutch 23.

The shift control motor 25 rotates the shift drum 24 in accordance with the instruction from the AMT control unit 18. When the shift drum 24 is rotated, the shift fork 29 is displaced in the axial direction of the shift drum 24 along a shape of a cam groove formed in an outer periphery of the shift drum 24 so as to move the clutch. Due to the movement of the clutch, the meshing of the gears on the counter shaft 27 with the gears on the main shaft 26 is changed and hence, the transmission gear 21 is shifted up or down.

Figure 2:
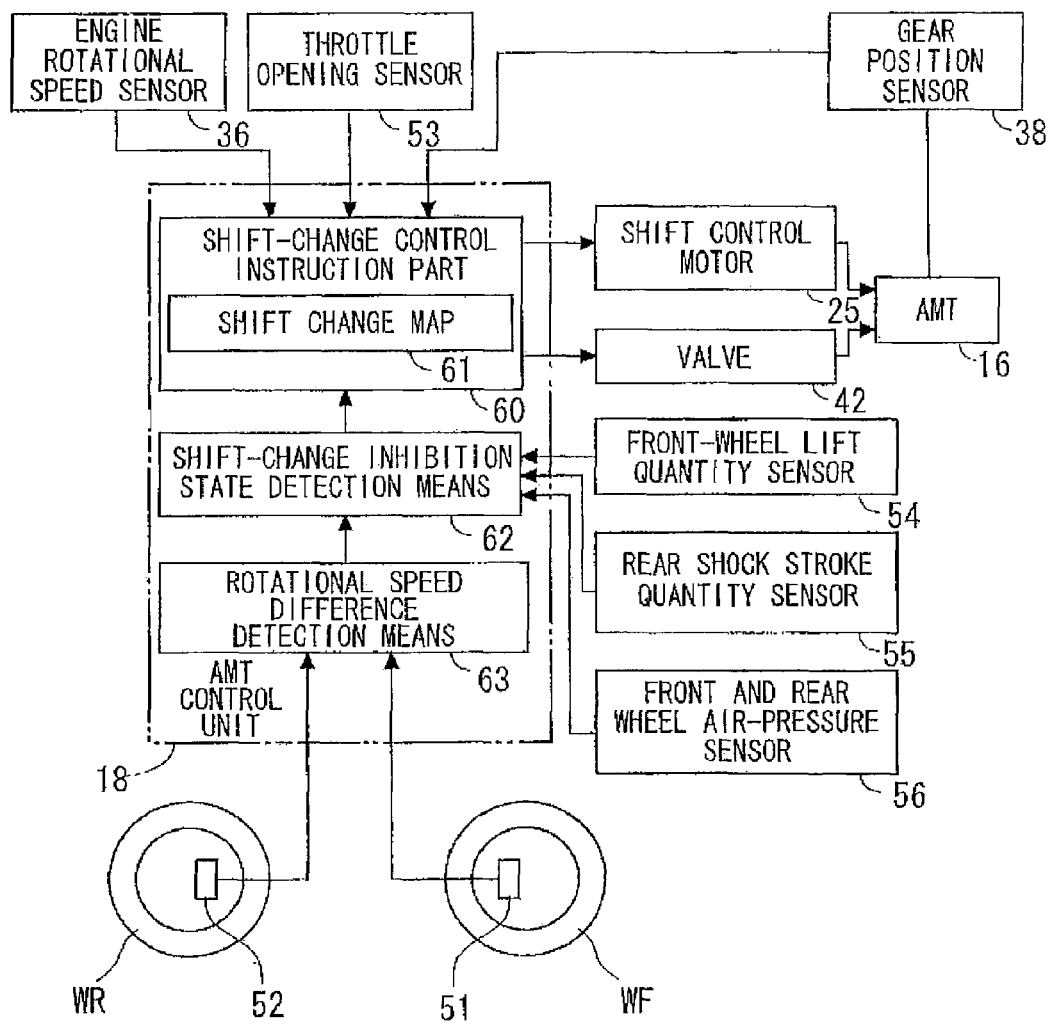
FIG. 2 is a block diagram showing the constitution of an AMT control unit according to one embodiment of the present invention and devices around the AMT control unit.

FIG. 2 is a block diagram showing the constitution of the AMT control unit according to one embodiment of the present invention and devices around the AMT control unit. In FIG. 2, parts identical with the parts shown in FIG. 1 are given the same symbols. The AMT control unit 18 includes a shift-change control instruction part 60, which stores a shift-change map 61 therein, a shift-change inhibition state detection means 62, and a rotational speed difference detection means 63. The shift-change control instruction part 60, which constitutes a control part, is configured to drive the shift control motor 25 and the valve 42 in accordance with the shift-change map 61 formed of a three-dimensional map based on an output signal of the engine rotational speed sensor 36, an output signal of the throttle opening sensor 53, and an output signal of the gear position sensor 38 and the vehicle-speed information.

The transmission control device of the motorcycle according to this embodiment includes a first sensor 51 for detecting a rotational speed of the front wheel WF, which constitutes a driven wheel and a second sensor 52 for detecting a rotational speed of the rear wheel WR, which constitutes a drive wheel. The transmission control device is configured to detect the difference in rotational speed between the front wheel and the rear wheel using the rotational-speed difference detection means 63. The detection of the vehicle speed during normal traveling, to consider the difference between an outer diameter of the front wheel and an outer diameter of the rear wheel, may be performed using either one of the first sensor 51 and the second sensor 52.

When the motorcycle is accelerated, there may occur a phenomenon such as "front-wheel floating traveling" in which the motorcycle travels only by the rear wheel WR in a state that the front wheel WF is separated from a road surface, or "wheel spin" in which a driving force of the rear wheel WR exceeds a frictional force between a tire and the road surface so that the driving force is not transmitted to a road surface thus causing a slip of the rear wheel. In such a case, for example, when the transmission control device is configured to detect vehicle-speed information used as the reference of the shift-change control only using the second sensor 52, even in the front-wheel floating traveling state or in the wheel spin state, the automatic shift change is sequentially performed in accordance with the rotational speed of the rear wheel WR. This shift change operation may fluctuate the rotational speed of the rear wheel WR thus giving rise to a possibility, for example, that a posture of a vehicle body during the front-wheel floating traveling is changed or, a grip force of the rear wheel WR is suddenly restored during the wheel spin traveling. To cope with the above-mentioned drawback, the transmission control device of the motorcycle according to the present invention includes a transmission control device that detects the rotational speed of the front wheel and the rotational speed of the rear wheel respectively, and when it is detected that the rotational speed of the rear wheel WR is larger than the rotational speed of the front wheel WF by a predetermined value or more, it is determined that the floating of the front wheel or the wheel spin occurs, and the automatic shift change of the transmission is inhibited.

The rotational-speed difference detection means 63 calculates the difference in rotational speed between the front wheel and the rear wheel by comparing information obtained by the first sensor 51, which detects the rotational speed of the front wheel WF constituting the driven wheel and information obtained by the second sensor 52, which detects the rotational speed of the rear wheel WR constituting the drive wheel. Furthermore, when it is detected that the rotational speed of the rear wheel WR becomes larger than the rotational speed of the front wheel WF by a predetermined value or more, the shift-change inhibition state detection means 62 transmits a signal that the shift change of the motorcycle is to be inhibited to the shift-change control instruction part 60 so that the shift-change operation is inhibited. A front-wheel lift quantity sensor 54, a rear shock stroke quantity sensor 55 and front and rear wheel air-pressure sensors 56, which respectively input output signals to the shift-change inhibition state detection means 62, are explained later.

Figure 3:
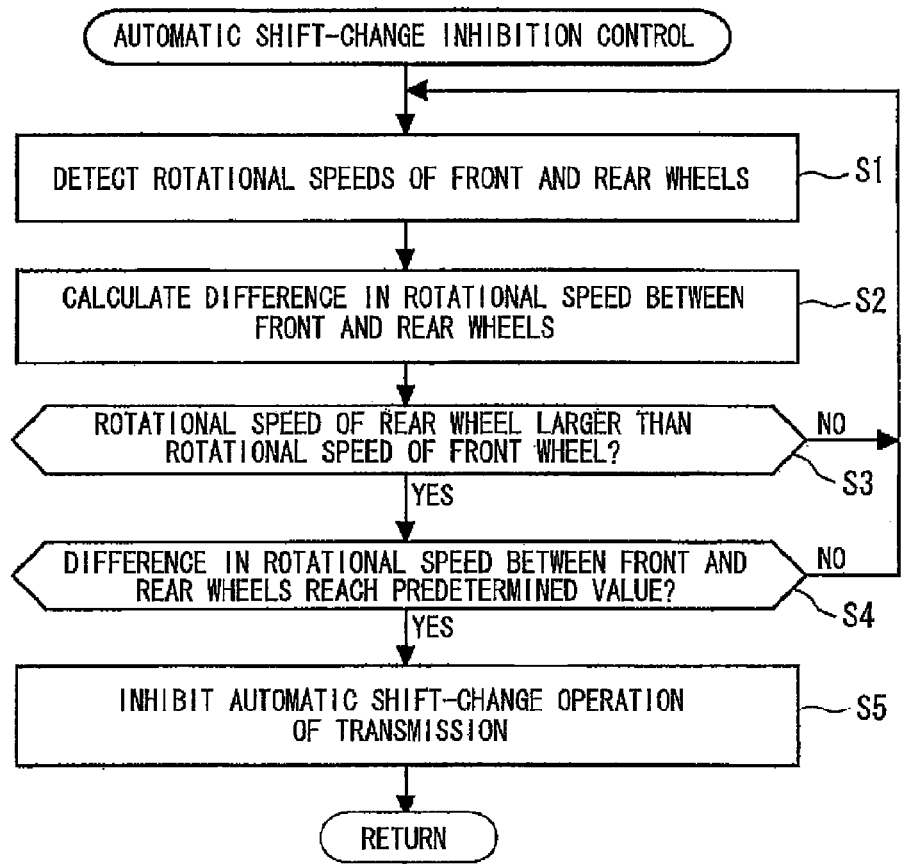
FIG. 3 is a flowchart showing a flow of an automatic shift-change inhibition control.

FIG. 3 is a flowchart showing a flow of the automatic shift-change inhibition control according to the present invention. When the rotational speeds of the front and rear wheels are respectively detected by the first sensor 51 and the second sensor 52 in step S1, the difference in rotational speed between the front wheel and the rear wheel is calculated by the rotational speed difference detection means 63 in step S2.

Then, in step S3, it is determined whether or not the rotational speed of the rear wheel is larger than the rotational speed of the front wheel. When the determination in step S3 is affirmative, the processing advances to step S4. In step S4, it is determined whether or not the difference in rotational speed between the front wheel and the rear wheel reaches a predetermined value by the shift-change inhibition state detection means 62. When the determination in step S4 is affirmative, the processing advances to step S5. When the determinations in step S3 and the determination in step S4 are negative, the processing returns to step S1. Then, in step S5, a shift-change inhibition instruction is outputted to the shift-change control instruction part 60 so as to inhibit the shift-change operation of the AMT 16 by inhibiting the driving of the shift control motor 25 and the valve 42. Accordingly, a series of automatic shift change inhibition control is finished. When the motorcycle returns to the normal traveling state from the front-wheel floating traveling state or the wheel spin state during a period in which the automatic shift change is inhibited, it is possible to changeover the automatic shift-change inhibition control to the normal automatic shift change control.

The first sensor 51 and the second sensor 52 may preferably be formed of a non-contact sensor, which can measure a passing interval of a pickup portion mounted on the vehicle wheel using a Hall element or the like. Furthermore, the rotational speed of the rear wheel WR may be calculated by a sensor (not shown in the drawing), which detects a rotational speed of the shift gear in the inside of the AMT 16 or the like in place of the second sensor 52.

Figure 4:
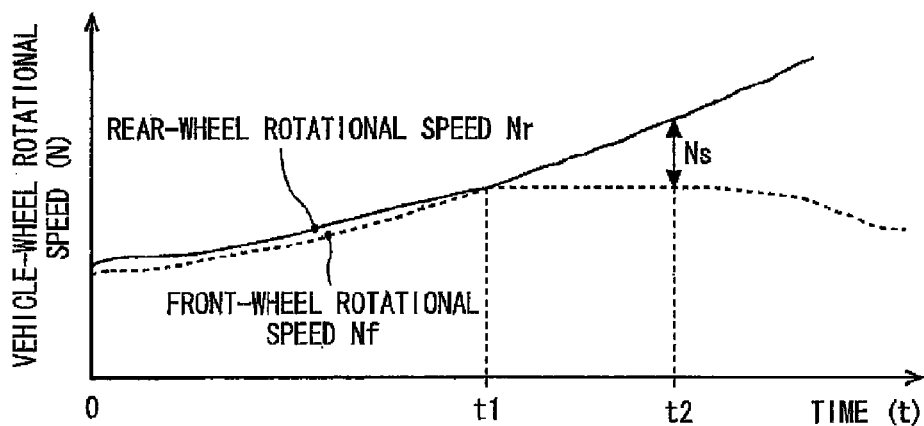
FIG. 4 is a graph showing one example of a transition of rotational speeds of the front and rear wheels at the time of acceleration.

FIG. 4 is a graph showing one example of the transition of the rotational speeds of the front and rear wheels at the time of acceleration. In this embodiment, as shown in FIG. 4, after starting the acceleration, the front wheel WF starts to separate from the road surface at a point of time t1, and the difference in rotational speed between the front wheel WF and the rear wheel WR reaches Ns at a point of time t2. In this graph, even during a period before the point of time t1 indicative of the normal acceleration state before the front-wheel floating traveling, the slight difference is generated between the rotational speed Nf of the front wheel WF and the rotational speed Nr of the rear wheel WR. This slight difference directly indicates the difference in rotational speed generated by the difference between the outer diameter of the front wheel and the outer diameter of the rear wheel.

The front wheel WF is rotated only by an inertial force immediately after the front wheel starts separation from the road surface at the point of time t1. Thereafter, the rotational speed of the front wheel is gradually decreased. To the contrary, the rotational speed of the rear wheel WR is gently increased. When the difference in rotational speed becomes a predetermined value Ns (for example, 10 km/h when becomes as a vehicle speed) or more at the point of time t2, the shift-change operation (shift-up or shift-down) of the AMT 16 is inhibited. Accordingly, there is no possibility that a change of the driving force, which a rider can hardly expect, is generated due to the automatic shift change during the front-wheel floating traveling thus preventing the rider from feeling discomfort.

On the other hand, when the wheel spin state occurs at the time of acceleration, the rotational speed Nr of the rear wheel WR is sharply increased compared to the rotational speed Nf of the front wheel WF. Hence, the difference in rotational speed becomes the predetermined value Ns or more. Also in this case, by inhibiting the automatic shift change, it is possible to prevent the occurrence of change of the driving force on the rear wheel WR during the wheel spin state which a rider hardly expect.

Further, in this embodiment, when a separation quantity between the front wheel WF and the road surface, that is, a lift quantity of the front wheel WF becomes a predetermined value or more during the front-wheel floating traveling, a clutch disconnection control which prevents the further increase of the lift quantity by interrupting the transmission of the driving force to the rear wheel WR is also executed. Accordingly, as shown in FIG. 2, information from the front-wheel lift quantity sensor 54, the rear shock stroke quantity sensor 55, and the front and rear wheel air-pressure sensors 56 is inputted to the shift-change inhibition state detection means 62.

The front-wheel lift quantity sensor 54 may preferably be formed of a non-contact sensor such as a photo sensor which is arranged in the vicinity of an axle of the front wheel WF and directly measures a distance between the front wheel WF and the road surface. The shift-change inhibition state detection means 62 instructs the shift-change control instruction part 60 to disconnect the clutches when the front-wheel lift quantity sensor 54 detects that the lift quantity of the front wheel WF becomes a predetermined value or more. The shift control instruction part 60 controls driving of the valve 42 so as to disconnect both the first clutch 22 and the second clutch 23 (see FIG. 1). Hence, the transmission of the driving force to the rear wheel WR is interrupted. Accordingly, a force which acts in the direction to separate the front wheel WF from the road surface is not generated. Hence, the vehicle body of the motorcycle changes the posture thereof in the direction to reduce the lift quantity of the front wheel WF.

Furthermore, the rear shock stroke quantity sensor 55 is a sensor, which can be used in place of the front-wheel lift quantity sensor 54. As a type of rear-wheel-side suspension of a motorcycle, there has been known a construction in which a swing arm (not shown in the drawing), which pivotally and rotatably supports the rear wheel WR, is pivotally and rockably supported on a rear portion of the vehicle body frame. A rear shock unit, which constitutes a shock absorber having a spring, is arranged between the swing arm and the vehicle body frame, thus suspending the rear wheel WR from a vehicle body. When a motorcycle having such a construction performs front-wheel floating traveling, when a load of the rear wheel is increased along with the increase of the lift quantity of the front wheel, a shrinking quantity of the rear shock unit also tends to be increased.

This embodiment focuses on the relationship between the lift quantity of the front wheel and the shrinking quantity of the rear shock unit, and determines whether or not the lift quantity of the front wheel reaches a predetermined value based on a signal from a sensor for detecting a stroke quantity of the rear shock unit. A displacement sensor, which has a simple construction compared to a photo sensor, can be used as the sensor for detecting the stroke quantity. The relationship between the lift quantity of the front wheel and the shrinking quantity of the rear shock unit is also influenced by a driving force imparted to the rear wheel WR or the like. Hence, the throttle opening or the like may be added as one of the parameters constituting disconnection conditions of the clutch.

Furthermore, the front and rear wheel air-pressure sensors 56 are formed of a sensor, which can be used in place of the above-mentioned two sensors. As described above, when the motorcycle performs front-wheel floating traveling, when the load of the rear wheel is increased along with the increase of the lift quantity of the front wheel, the air pressure of the rear wheel WR tends to be increased compared to the front wheel WF from which a load is removed. This embodiment focuses on the relationship between the lift quantity of the front wheel and the change of the air pressure of the front and rear wheels, and estimates whether or not the lift quantity of the front wheel reaches a predetermined value based on the output signal from the sensor, which always detects air pressure. The front and rear wheel air-pressure sensors 56 may preferably be configured such that the front and rear wheel air-pressure sensors 56 can be mounted on an air valve or the like of the respective front and rear wheels independently, include a signal transmission antenna and a built-in power source, and can transmit detected air pressure to a control part in a form of electric wave signals. Furthermore, with the use of such air pressure sensor, it is also possible to perform maintenance before and after traveling, detect tire puncture during traveling and the like. Hence, it is possible to allow such a highly useful device to also play a role of detecting a lift state of the front wheel.

FIG. 5 is a flowchart showing a flow of the automatic shift-change inhibition control and the clutch interruption control. This flowchart shows the flow when the clutch interruption control is executed subsequent to the automatic shift-change inhibition control shown in FIG. 3. In FIG. 5, step S1 to step S5 are substantially equal to step S1 to step S5 shown in FIG. 3. When the automatic shift-change control of the transmission is inhibited in step S5, in subsequent steps S6 to 88, for preventing the lift quantity of the front wheel WF from becoming a predetermined value or more at the time of front-wheel floating traveling, various determinations are executed using various sensors. The predetermined value of the lift quantity of the front wheel WF may be set to a value, which allows an erection angle of the vehicle body with respect to the road surface to assume 45 degree, for example.

In step S6, it is determined whether or not the lift quantity of the front wheel WF becomes the predetermined value or more by the front-wheel lift quantity sensor 54. Furthermore, in step S7, it is determined whether or not the stroke quantity (shrinking quantity) of the rear shock detected by the rear shock stroke quantity sensor 55 becomes a predetermined value or more. Furthermore, in step S8, with respect to the air pressure of the front wheel and the air pressure of the rear wheel detected by the front wheel air-pressure sensor 56 and the rear wheel air-pressure sensor 56 respectively, it is determined whether or not the air pressure of the rear wheel WR is larger than the air pressure of the front wheel WF and whether or not the difference in air pressure between the rear wheel WR and the front wheel WF becomes a predetermined value or more. Furthermore, when the determination made in any one of steps S6, S7 and S8 is affirmative, the processing advances to step S9, and the disconnection control of the clutch is executed by the shift-change control instruction part 60. Accordingly, a series of processing is finished. When the respective determinations made in all steps S6, S7 and S8 are negative, it is determined that the lift quantity of the front wheel WF does not become the predetermined value or more. Hence, the processing is finished without executing the disconnection control of the clutch.

The above-mentioned construction of the transmission control device of the motorcycle includes three kinds of sensors consisting of the front-wheel lift quantity sensor 54, the rear shock stroke quantity sensor 55, and the front and rear wheel air-pressure sensors 56. However, the transmission control device may be configured to include at least any one of these sensors. Furthermore, the clutch disconnection control shown in steps S6 to S9 may be executed parallel to the shift-change inhibition control instead of being executed after executing the shift-change inhibition control. Accordingly, even when the front wheel WF is suddenly lifted due to the sharp acceleration so that the lift quantity of the front wheel WF becomes the predetermined value or more before the difference in rotational speed between the rear wheel WR and the front wheel WF reaches the predetermined value, it is possible to speedily disconnect the clutch thus decreasing the lift quantity of the front wheel.

As has been explained heretofore, according to the transmission control device of the motorcycle of the present invention, the rotational speed detection means is respectively mounted on the front and rear wheels, and when it is detected that the rotational speed of the rear wheel WR is larger than the rotational speed of the front wheel WF by the predetermined value or more, the automatic shift change of the transmission is inhibited. Accordingly, there exists no possibility that the change of driving force attributed to the automatic shift change occurs on the rear wheel WR in the front-wheel floating traveling state or in the wheel spin state of the motorcycle thus preventing the rider from feeling discomfort.

The difference in rotational speed between the front wheel and the rear wheel for executing the shift-change inhibition control, and the execution conditions of the shift-change inhibition control and the like are not limited to the conditions used in the above-mentioned embodiment, and various modifications are conceivable as such conditions. For example, as an execution condition of the shift-change inhibition control, it may be possible to add a condition that the rotational speed of the rear wheel WR is set to a predetermined value (for example, 50 km/h when expressed as a vehicle speed) or less or the like. Furthermore, the automatic transmission may be constituted of a V-belt-type continuously variable transmission which drives a shift change pulley using an actuator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission control device of a motorcycle comprising:
   a control part that is configured to perform an automatic shift change of a transmission in response to at least vehicle-speed information;
   a first sensor that detects a rotational speed of a front wheel, which constitutes a driven wheel;
   a second sensor that detects a rotational speed of a rear wheel, which constitutes a drive wheel; and
   a rotational-speed-difference detector that is configured to detect a difference in rotational speed between the front wheel and the rear wheel based on information from the first sensor and the second sensor,
   wherein the control part inhibits the automatic shift change when the rotational speed of the rear wheel becomes larger than the rotational speed of the front wheel and the difference in rotational speed between the front wheel and the rear wheel becomes a predetermined value or exceeds the predetermined value.

2. The transmission control device of a motorcycle according to claim 1, wherein the transmission control device is configured to interrupt the transmission of a driving force to the rear wheel by disconnecting a clutch when a separation quantity between the front wheel and a road surface becomes a predetermined value or exceeds the predetermined value during the inhibition of the automatic shift change.

3. The transmission control device of a motorcycle according to claim 2, wherein the separation quantity between the front wheel and the road surface is obtained by calculating a distance between the front wheel and the road surface using a photo sensor.

4. The transmission control device of a motorcycle according to claim 2, wherein the transmission control device includes a sensor for detecting a stroke quantity of a rear shock unit provided for suspending the rear wheel from a vehicle body, and the control part determines whether or not the separation quantity between the front wheel and the road surface reaches the predetermined value based on whether or not the stroke quantity reaches a predetermined value.

5. The transmission control device of a motorcycle according to claim 2, wherein the transmission control device further includes an air pressure detector that is configured to detect air pressure of the front wheel and air pressure of the rear wheel, and the control part determines whether or not the separation quantity between the front wheel and the road surface reaches the predetermined value based on whether or not the air pressure of the rear wheel is larger than the air pressure of the front wheel and the difference in air pressure between the front wheel and the rear wheel reaches a predetermined value.

6. The transmission control device of a motorcycle according to claim 1, wherein the control part stores a shift-change map therein, the shift-change map including a three-dimensional map, and the control part is configured to drive a shift control motor in accordance with the shift change map.

7. The transmission control device of a motorcycle according to claim 6, wherein the shift control motor is driven based on an output signal of an engine rotational speed sensor, an output of a throttle opening sensor, an output signal of a gear position sensor and vehicle speed information.

8. The transmission control device of a motorcycle according to claim 1, further comprising a front-wheel lift quantity sensor formed of a non-contact sensor arranged in the vicinity of an axle of the front wheel, the front-wheel lift quantity sensor being configured to measure a distance between the front wheel and a surface of the road, wherein the control part inhibits the automatic shift change when the front-wheel lift quantity sensor detects a lift quantity of the front wheel above a predetermined value.

9. The transmission control device of a motorcycle according to claim 1, wherein the transmission control device is configured to be capable of simultaneously inhibiting the automatic shift change and disconnecting a clutch to interrupt a transmission of a drive force to the rear wheel.

10. A transmission control device of a motorcycle comprising:
a control unit including:
a shift-change control instruction part;
a shift-change inhibition state detector; and
a rotational speed difference detector;
a first sensor that detects a rotational speed of a front wheel, which constitutes a driven wheel; and
a second sensor that detects a rotational speed of a rear wheel, which constitutes a drive wheel,
wherein the rotational-speed-difference detector is configured to detect a difference in rotational speed between the front wheel and the rear wheel based on information from the first sensor and the second sensor, and the shift-change inhibition state detector inhibits automatic shift change when the rotational speed of the rear wheel becomes larger than the rotational speed of the front wheel and the difference in rotational speed between the front wheel and the rear wheel becomes a predetermined value or exceeds the predetermined value.

11. The transmission control device of a motorcycle according to claim 10, wherein the transmission control device is configured to interrupt the transmission of a driving force to the rear wheel by disconnecting a clutch when a separation quantity between the front wheel and a road surface becomes a predetermined value or exceeds the predetermined value during the inhibition of the automatic shift change.

12. The transmission control device of a motorcycle according to claim 11, wherein the separation quantity between the front wheel and the road surface is obtained by calculating a distance between the front wheel and the road surface using a photo sensor.

13. The transmission control device of a motorcycle according to claim 11, wherein the transmission control device includes a sensor for detecting a stroke quantity of a rear shock unit provided for suspending the rear wheel from a vehicle body, and the control part determines whether or not the separation quantity between the front wheel and the road surface reaches the predetermined value based on whether or not the stroke quantity reaches a predetermined value.

14. The transmission control device of a motorcycle according to claim 11, wherein the transmission control device further includes an air pressure detector that is configured to detect air pressure of the front wheel and air pressure of the rear wheel, and the control part determines whether or not the separation quantity between the front wheel and the road surface reaches the predetermined value based on whether or not the air pressure of the rear wheel is larger than the air pressure of the front wheel and the difference in air pressure between the front wheel and the rear wheel reaches a predetermined value.

15. The transmission control device of a motorcycle according to claim 10, wherein the control part stores a shift-change map therein, the shift-change map including a three-dimensional map, and the control part is configured to drive a shift control motor in accordance with the shift change map.

16. The transmission control device of a motorcycle according to claim 15, wherein the shift control motor is driven based on an output signal of an engine rotational speed sensor, an output of a throttle opening sensor, an output signal of a gear position sensor and vehicle speed information.

17. The transmission control device of a motorcycle according to claim 10, further comprising a front-wheel lift quantity sensor formed of a non-contact sensor arranged in the vicinity of an axle of the front wheel, the front-wheel lift quantity sensor being configured to measure a distance between the front wheel and a surface of the road, wherein the control part inhibits the automatic shift change when the front-wheel lift quantity sensor detects a lift quantity of the front wheel above a predetermined value.

18. The transmission control device of a motorcycle according to claim 10, wherein the control unit is configured to be capable of simultaneously inhibiting the automatic shift change and disconnecting a clutch to interrupt a transmission of a drive force to the rear wheel.

* * * * *